Nov. 14, 1967   M. PIANKO   3,352,106
COMBUSTION CHAMBER WITH WHIRLING SLOTS
Filed Oct. 21, 1965   6 Sheets-Sheet 1
FIG.1
FIG.2
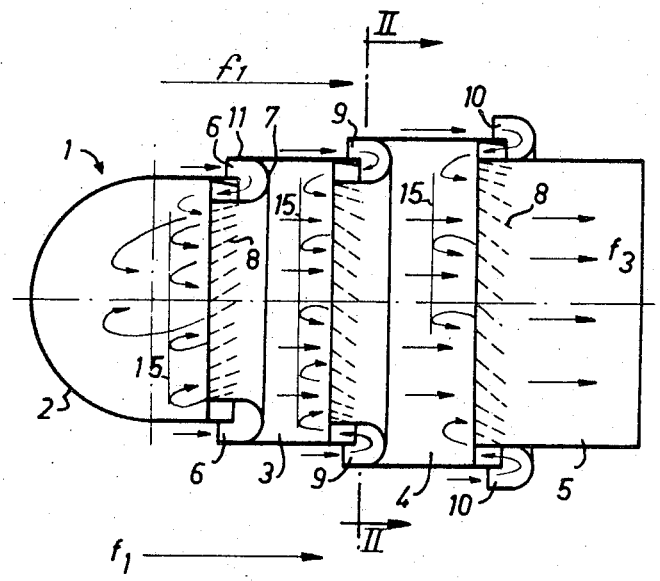
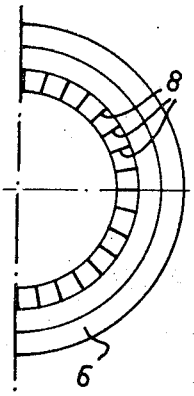
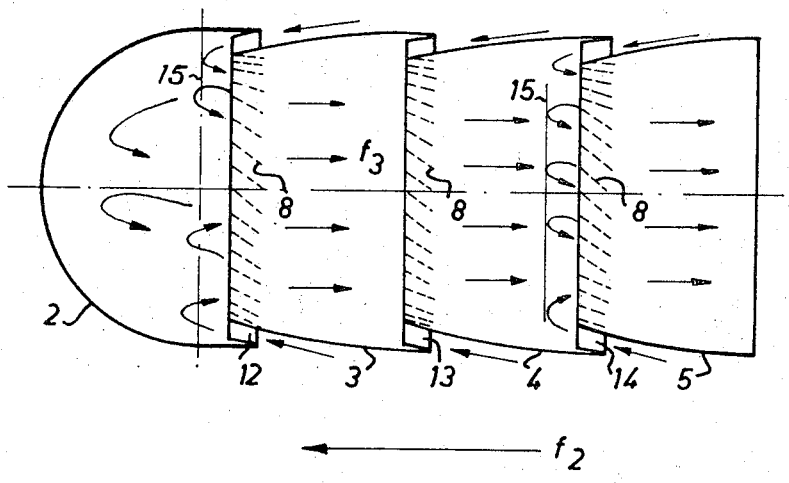
FIG.3
Inventor
Marc Pianko
By
Karl W. Flocks
Attorney Nov. 14, 1967  M. PIANKO  3,352,106
COMBUSTION CHAMBER WITH WHIRLING SLOTS
Filed Oct. 21, 1965  6 Sheets-Sheet 5

Inventor
Marc Pianko
By
Karl W. Flocks
Attorney

United States Patent Office 3,352,106
Patented Nov. 14, 1967

3,352,106
COMBUSTION CHAMBER WITH
WHIRLING SLOTS
Marc Pianko, 101 Residence Elysee No. 2,
La Celle Saint-Cloud, France
Filed Oct. 21, 1965, Ser. No. 500,082
Claims priority, application France, Dec. 23, 1964, 999,715
4 Claims. (Cl. 60—39.65)

ABSTRACT OF THE DISCLOSURE

A combustion chamber for an internal combustion propulsion unit utilizing longitudinally extending slots with fins causing a general rotation and stirring of the air inside the chamber, which air has been picked up from the outside flow of air.

The present invention relates to a combustion chamber, and more particularly to a combusion chamber intended to ensure the mixture of primary air with a liquid of gaseous fuel in an internal-combustion propulsion unit using air under pressure as a propellent fluid.

The combustion of a stoichiometric mixture of primary air in a combustion chamber brings the temperature of the fluid to the level of the order of 2,000° C. This temperature must therefore be reduced by an excess of air, and it often becomes necessary to employ special refractory steels for the construction of the parts of this zone.

A first object of the invention is to provide a combustion chamber cooled to a permissible temperature in order that it may then be possible to manufacture the parts of its structure of simple stainless steel.

The invention has also for its object to eliminate expensive parts such as the burner, flame-stabilizer, and vortex device from the combustion chamber.

The invention has for its further object a combustion chamber having a small overall size, the time of stay of the fluid in the primary zone being increased and the flame being efficiently stabilized over at least one locally defined zone.

A further object of the invention is to ensure a long period of life for the chamber, the metal walls of the said chamber being insulated from the hot gases burning in the interior.

The invention has for a further object to reduce the pressure losses during the passage of the fluid into the said chamber.

Another object of the invention is to provide parameters of construction which permit very great flexibility of regulation, so as to ensure for the factors which contribute to the efficiency of the propulsion device a good spontaneous adaptation of the chamber over an extended range of different richness of the mixture:

A general rotation of the air;
A stirring action;
A combustion of the primary air which is as complete as possible.

Other characteristic features and advantages will be brought out from the description which follows below with reference to the accompanying drawings and giving by way of indication but not in any limitative sense, a particular form of the selected example of construction.

In the drawings:

FIG. 1 is a view in longitudinal section, partly broken away, of a tubular device according to the invention, in which the general circulation of the fluid is provided in a single general direction;

FIG. 2 is a cross-section taken along the line II—II of FIG. 1;

FIG. 3 is a view in longitudinal section of a tubular device in which the general circulation of the fluid is provided in one direction outside the chamber and in another direction inside the chamber;

Figure 14:
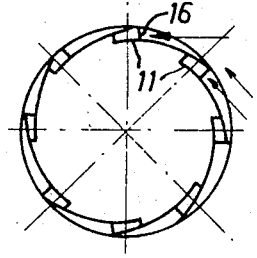
Figure 10:
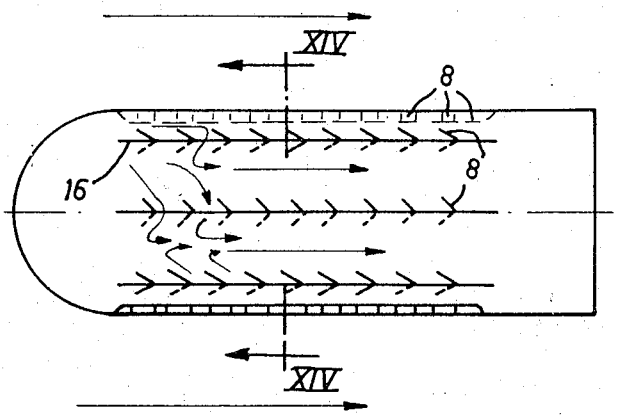
Figure 15:
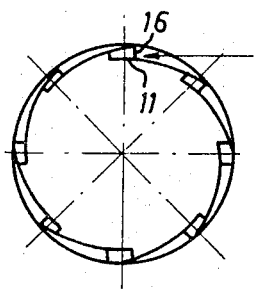
Figure 11:
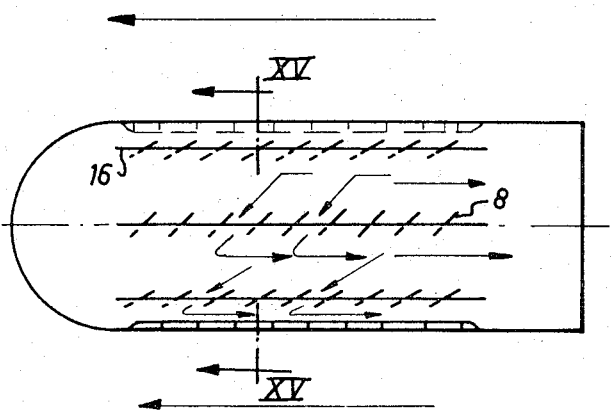
Figure 16:
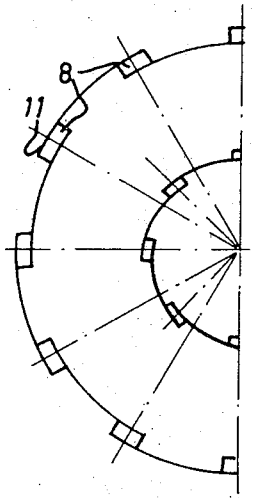
Figure 12:
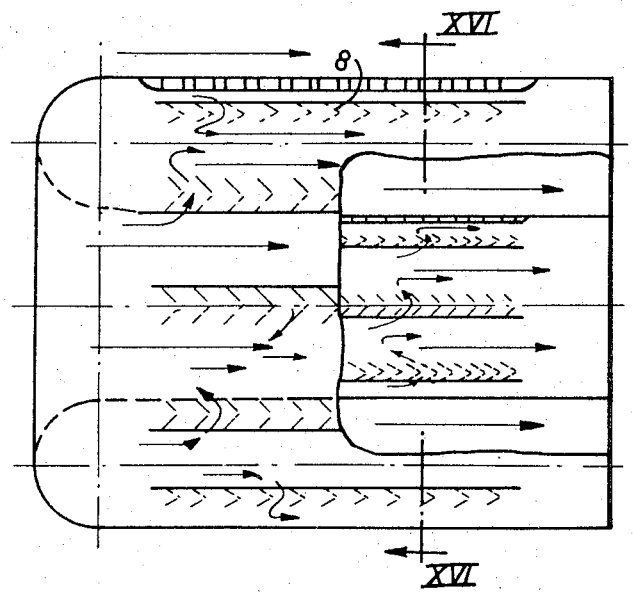
Figure 17:
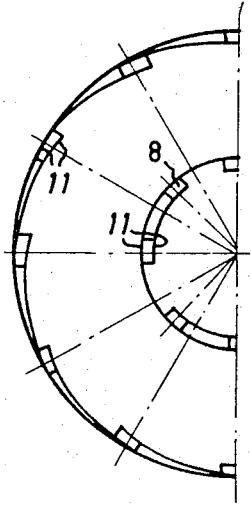
Figure 13:
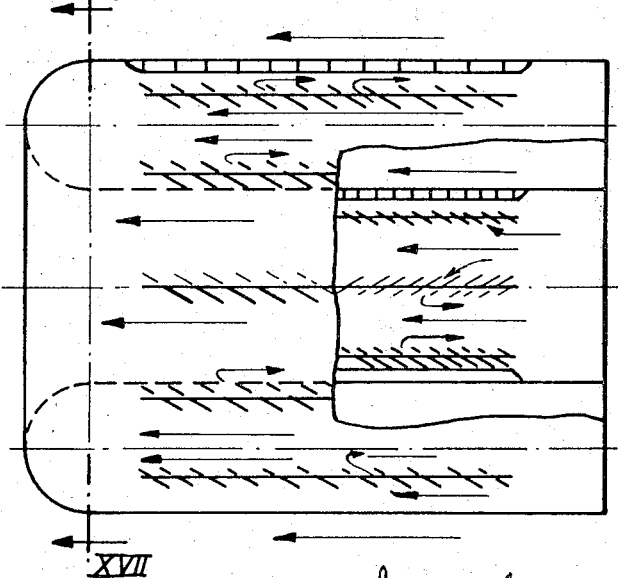

The respectively corresponding FIGS. 10, 11, 12 and 13 are similar perspective views of another alternative form;

FIGS. 14 and 15 are cross-sections taken respectively along the planes XIV—XIV of FIG. 10 and XV—XV of FIG. 11, and FIGS. 16 and 17 are half-sections taken respectively along the planes XVI—XVI of FIG. 12 and XVII—XVII of FIG. 13.

There can be seen in FIG. 1, around the tubular combustion chamber according to the invention, indicated generally by the reference 1, a current of forced combustion supporting air driven in the direction of the arrow $f1$. The injection of the fuel (not shown) into the combustion chamber is outside the scope of the present invention.

The said chamber is provided with a hood 2, behind which are located several compartments 3, 4 and 5, arranged in tiers. The first compartment 3 comprises an annular slot 6 between a lip 11 and the hood 2 through which passes the combustive air; a deflector 7 sends back the flow of air rearwards under the hood 2 and fins 8 channel and direct the air which then passes into the said first compartment after having changed direction a second time, and flows in the direction of the arrow $f3$.

A second intake of air is arranged in the same way at 9 between the first compartment 3 and the second compartment 4.

A third air intake is formed in the same way at 10 between the second compartment 4 and the third compartment 5.

In FIG. 3 there is shown an alternative form of the same construction, in which the relative wind which surrounds the chamber arrives in counterflow in the direction of the arrow $f2$ and passes through the slot 12 under the hood 2, through the slot 13 into the compartment 3, through the slot 14 into the compartment 4. From the hood, the air is returned in the opposite sense in the general direction of flow of the arrows $f3$, and finally all the primary air admitted to the chamber passes through the channels of the fins 8.

Figure 4:
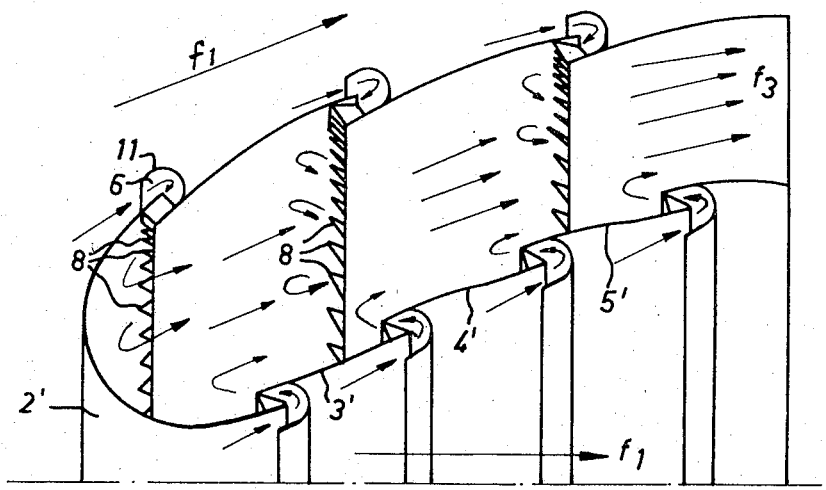
FIG. 4 is a view in perspective of an annular device in which the general circulation of the fluid is provided in a single general direction.
Figure 5:
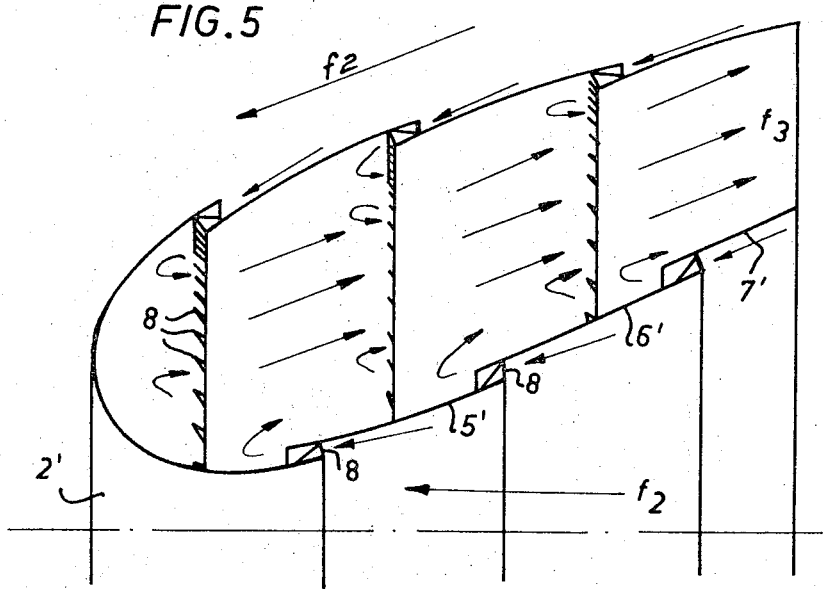
FIG. 5 is a perspective view of an annular device in which the general circulation of the fluid is provided in two opposite directions.

In FIGS. 4 and 5, there is shown a cross-section of a chamber according to the invention which is not tubular but annular. This annular chamber comprises an annular hood $2'$ and several compartments $5'$, $6'$ and $7'$. In FIG. 4, the air flows round the chamber in the direction of the arrow $f1$, the general direction of the relative wind being the same as that of the flow of fluid in the chamber, represented by the arrow $f3$.

On the other hand, in FIG. 5, the relative fluid flows in the direction of the arrow $f2$ in counterflow to the direction of the arrow $f3$.

It will be observed that in one preferred form of construction of an annular chamber, the fins 8 are arranged so as to direct the streams of air in the direction of the arrows $f2$, and that in another form of construction they are arranged in the direction of the arrows $f3$.

The device according to the present invention has thus the effect of compelling a circuit of combustive air to follow a course such that the air passes into the primary zone in the interior of the chamber 1 in counterflow to the general interior flow, and is then sent in the direction of the said general flow, this object being attained either by use of deflectors 7 or by the general direction adopted for the flow of air round the chamber.

Due to the fact that the air passes into the chamber in one direction and then passes through it in the opposite direction, there exist one or more direction-reversing zones 15 level with the slots 6, in which the speed of the air is locally zero. It is in these zones that the flame is stabilized.

By acting on the surfaces of these stabilization zones or by increasing the number of zones, the stability and the flexibility of the chamber are improved.

A dead space without penetration of air is left on the upstream side of the primary zone, in order to permit a good start to the combustion, and another dead space is provided on the downstream side of the primary zone so as to give the last fraction of primary air sufficient space to burn.

The fins 8 can be welded between the lips of the slots 6 and thus rigidly fix two consecutive compartments to each other.

According to the invention, it is also desired to impress on the air a transverse movement of rotation in a plane perpendicular to the main axis of the chamber which prolongs its stay in the chamber and facilitates by stirring the homogeneous distribution of the fuel and the combustive air. To this end, each fin is inclined with respect to the corresponding diametral plane of the chamber; the fin may be flat or incurved.

The angle of the rotation impressed on the air may be more or less large. In the limit, it may be zero.

If all the fins impress a rotation on the air in the same direction, there is obtained a general rotation of the mass of the fluid contained in the primary zone. If the direction of rotation is crossed by passing from one slot to another, a stirring effect is obtained.

The deflector 7 is in fact an extension of the lip 11 towards the interior. In FIG. 1, the form of the deflector is rounded but other shapes are possible, for example rectangular or polygonal.

The downstream compartment 4 may be fixed to the upstream compartment 3 either on the inner part of the deflector 7, or by its lip 11, but this latter construction is the more advantageous since in this way the volume of the combustion chamber from upstream to downstream is increased.

It can be seen that when the combustion chamber is put into operation with a relatively poor mixture, the air which passes into the upstream part of the chamber 1 alone takes part in the combustion, the air passing into the downstream portion behaving like secondary air. However, this secondary air continues to play its part as a flame-stabilizer by slowing-down the general flow, and the flame remains always well stabilized.

Figure 6:
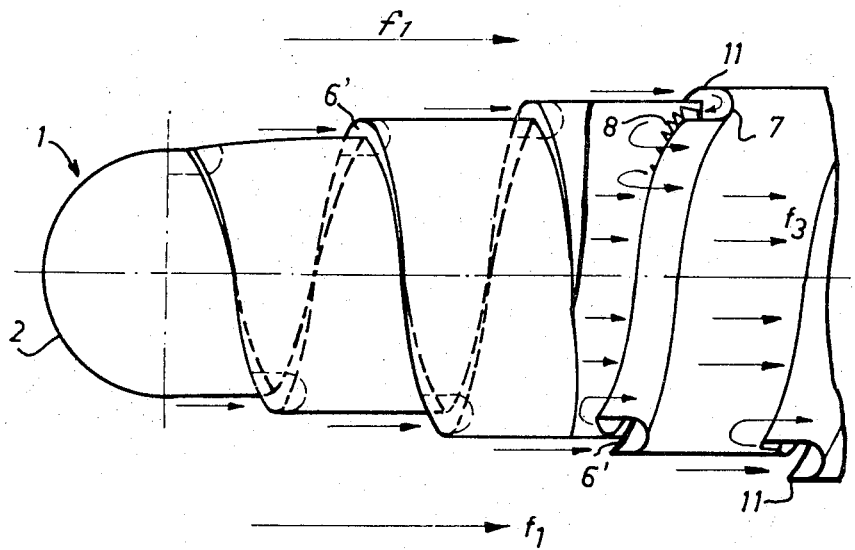
FIGS. 6, 7, 8 and 9 are similar perspective views, partly broken away, of an alternative form.

FIG. 6 shows a further example of construction of tubular chamber in which no separate compartments exist; the slot 6' is a continuous helix along the whole length of the chamber 1, around which the air flows in the direction of the arrow f1 which is in the same direction as the ejection arrow f3.

Figure 7:
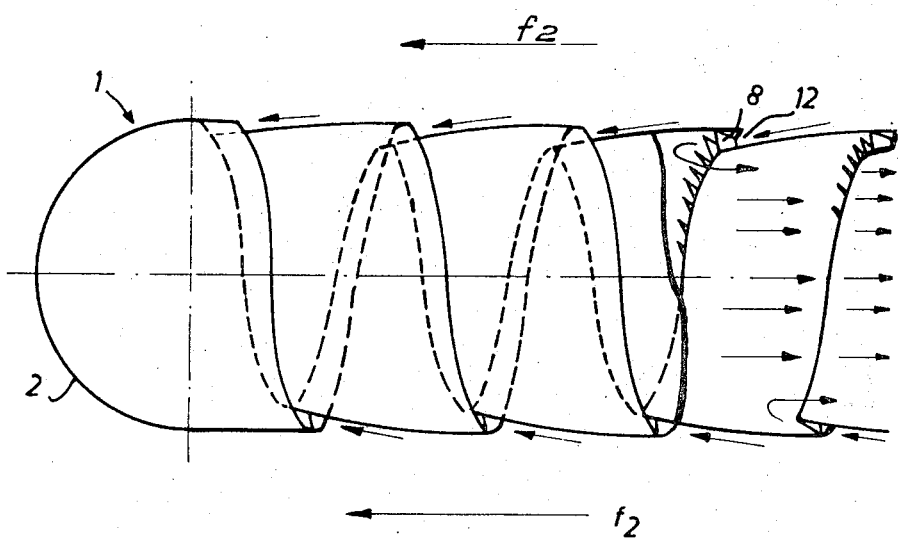

The sample of construction shown in FIG. 7 is similar, but the air of the relative wind flows in the direction of the arrow f2 in a direction opposite to that of the ejection.

Figure 8:
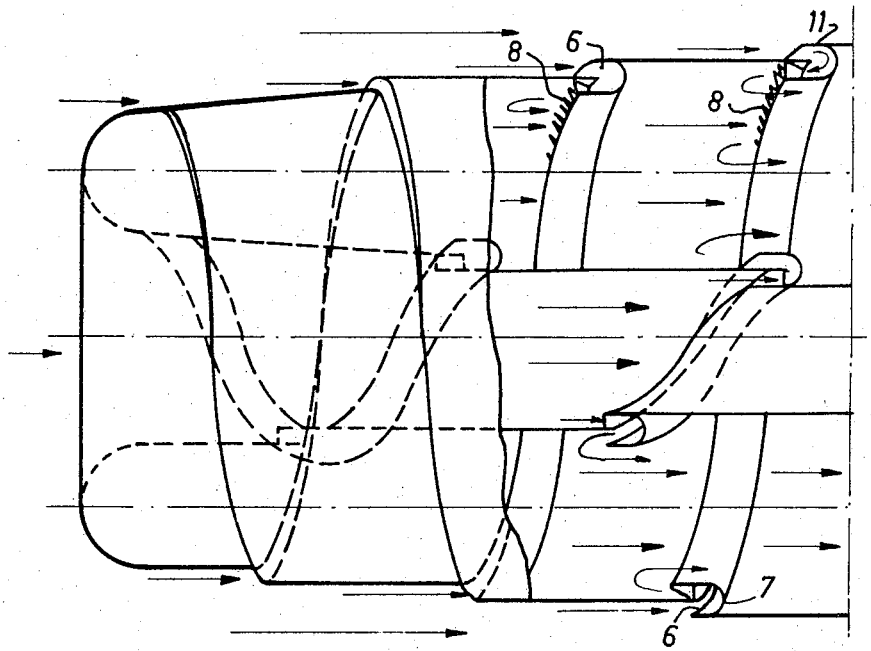
Figure 9:
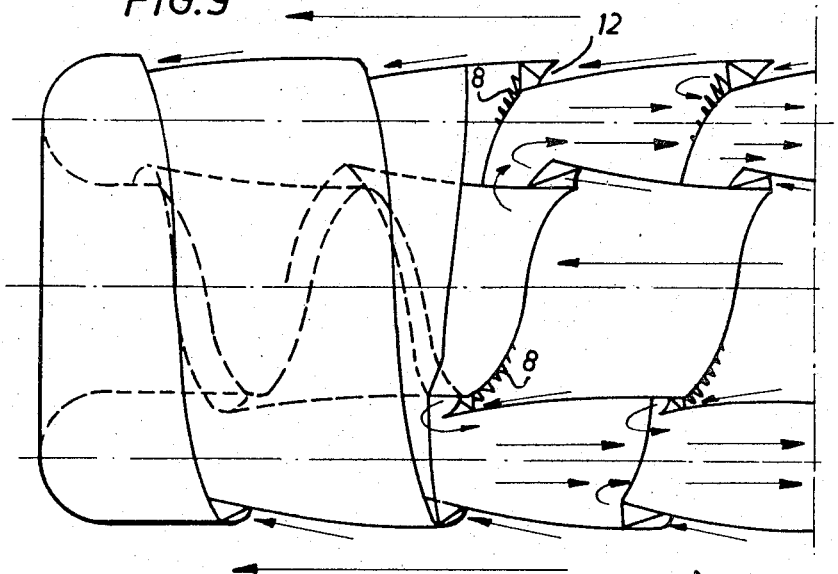

FIGS. 8 and 9 show similar arrangements, in which the reaction chamber is annular instead of being tubular.

In FIG. 10, there is shown a tubular device according to the invention, in which the air utilizes a number of longitudinal slots 16.

Each slot is composed of two lips 11 which overlap over a certain length and which are sufficient to give the air a movement of rotation.

A certain number of fins are welded to the two lips and fix them rigidly to each other. The fins also direct the air in counterflow to the general flow in the primary zone. In the case of FIG. 10, they play the part of a deflector. A maximum curvature with continuous variation of direction (for example with a generator line forming an arc of a circle) is the most suitable for reducing losses of pressure. Other shapes are however possible, for example interrupted fins.

The relative arrangement of the slots can be chosen in such manner that some of them cause the air to rotate transversely in one direction while others cause it to rotate in the opposite direction. In order that two consecutive slots can deflect the air in the same direction, it is only necessary that the outer lip of one should be extended to form the inner lip of the other. In order that two consecutive slots may deflect the air in opposite directions, its is necessary for the same part of the casing to be extended on both sides as an inner lip (or outer lip) of the two slots. In this way, it is possible to regulate a general rotational movement or a stirring effect.

In FIGS. 12, 13, 16 and 17 are shown other alternative forms of the invention with longitudinal slots, but the chamber is annular.

It will of course be understood that the present invention has been described above purely by way of indication but not in any limitative sense and that modifications of detail can be made thereto in conformity with its spirit without thereby departing from its scope.

I claim:
1. A combustion chamber intended for an internal combustion propulsion unit of the type in which a gaseous mixture burns in a primary zone, and utilizing air as the propellent fluid, comprising
at least one slot with lips generally extending longitudinally of the flame tube and at an angle to the longitudinal axis of said tube,
a deflector along said substantially longitudinal slot which reverses the direction of flow of the primary air entering said slot,
fins along said deflector, which are positioned in the portion lower than said lips of said slot and impress a rotary movement to the combustive air, thereby producing a stirring effect on the mixture, and by the extension of the time of stay of the fluid in the primary zone, the effective stabilization of the flame and the insulation of the reactor, enabling the overall size of the chamber and the technical requirements of the construction materials of the chamber to be reduced,
said flame tube being a substantially annular volume comprised between two cylinders, a plurality of said slots forming an angle with the longitudinal axis of the tube provided both on the inner surface and the outer surface of said annular volume where combustion takes place and where the stationary zones are obtained.

2. A combustion chamber intended for an internal combustion propulsion unit of the type in which a gaseous mixture burns in a primary zone, and utilizing air as the propellent fluid, comprising
at least one slot with lips generally extending longitudinally of the flame tube and at an angle to the longitudinal axis of said tube,
a deflector along said substantially longitudinal slot which reverses the direction of flow of the primary air entering said slot,
fins along said deflector, which are positioned in the portion lower than said lips of said slot and impress a rotary movement to the combustive air, thereby producing a stirring effect on the mixture, and by the extension of the time of stay of the fluid in the primary zone, the effective stabilization of the flame and the insulation of the reactor, enabling the overall size of the chamber and the technical requirements of the construction materials of the chamber to be reduced,
said angle formed by said slots with the longitudinal axis being null, the air being drawn by depression into the chamber through the said slots, said fins being chevron-shaped and receiving this air and subsequently deflecting this air to start it moving in a transversal direction and finally ending the movement of rotation started by said slots, the combination of said slots and said fins producing the formation of stationary zones.

3. A combustion chamber as claimed in claim 1 in which said chamber is annular and said slots for causing the exterior air which has served for cooling to pass into the interior of the chamber is constituted by two helicoidal slots, one slot being located in the interior on the central channel, the other slot being located on the outer periphery of said chamber, said slots being provided with said lips and said fins which compel the air to follow a sinuous path and confine the flame to stabilizing zones.

4. A combustion chamber according to claim 2, the flame tube being an annular volume substantially comprised between two cylinders and the said slots being provided both on the inner surfaces and outer surfaces of said annular volume.

References Cited

UNITED STATES PATENTS 2,952,126   9/1960   Denise _____ 60—39.65 X

FOREIGN PATENTS 597,151   1/1948   Great Britain.

RALPH D. BLAKESLEE, *Primary Examiner.*

MARK M. NEWMAN, *Examiner.*